March 20, 1934.  J. KEISTER  1,951,759
INTERNAL COMBUSTION ENGINE
Filed Nov. 16, 1931  3 Sheets-Sheet 1
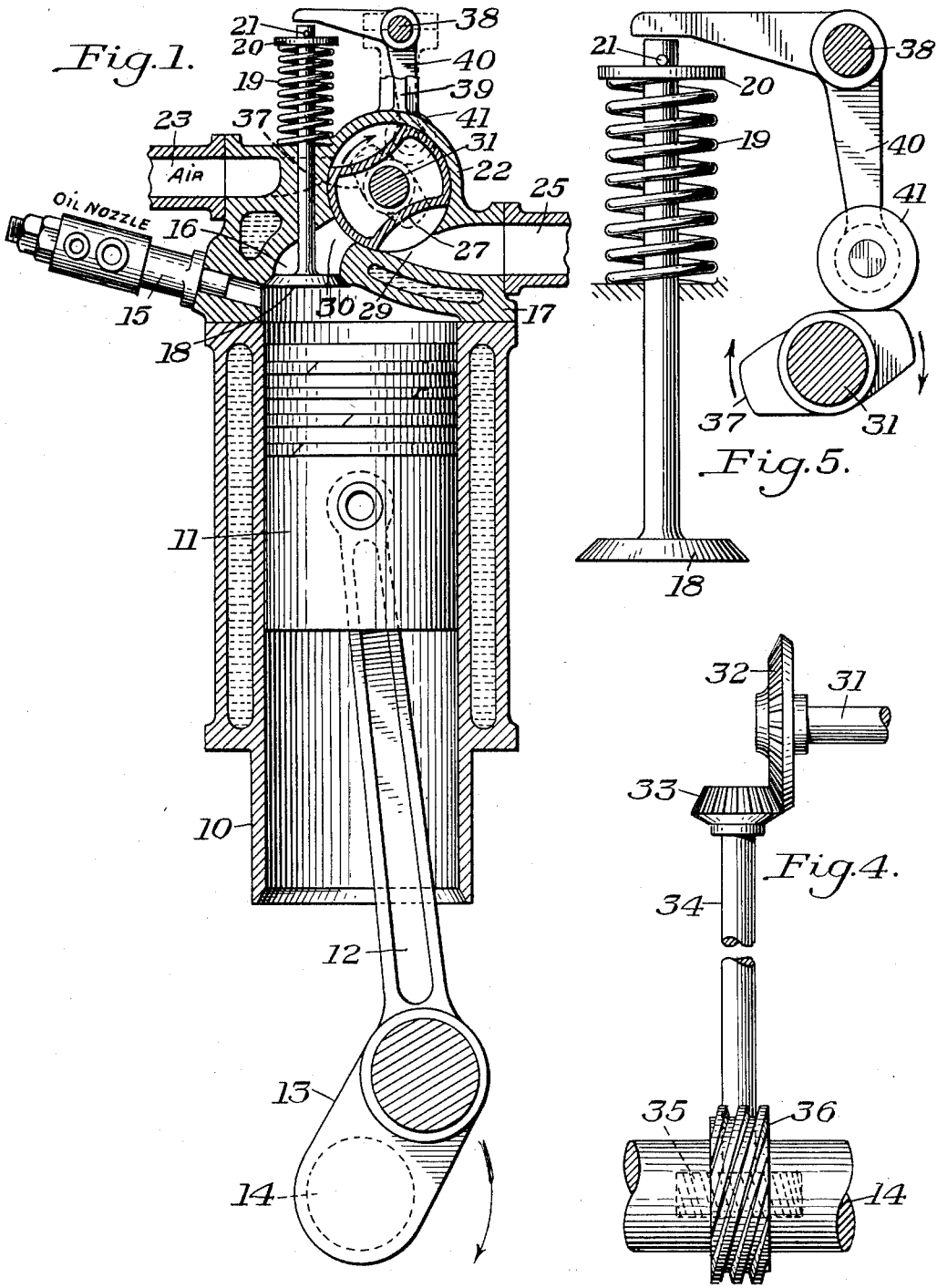
INVENTOR
James Keister,
Steward & McKey
his Attorneys

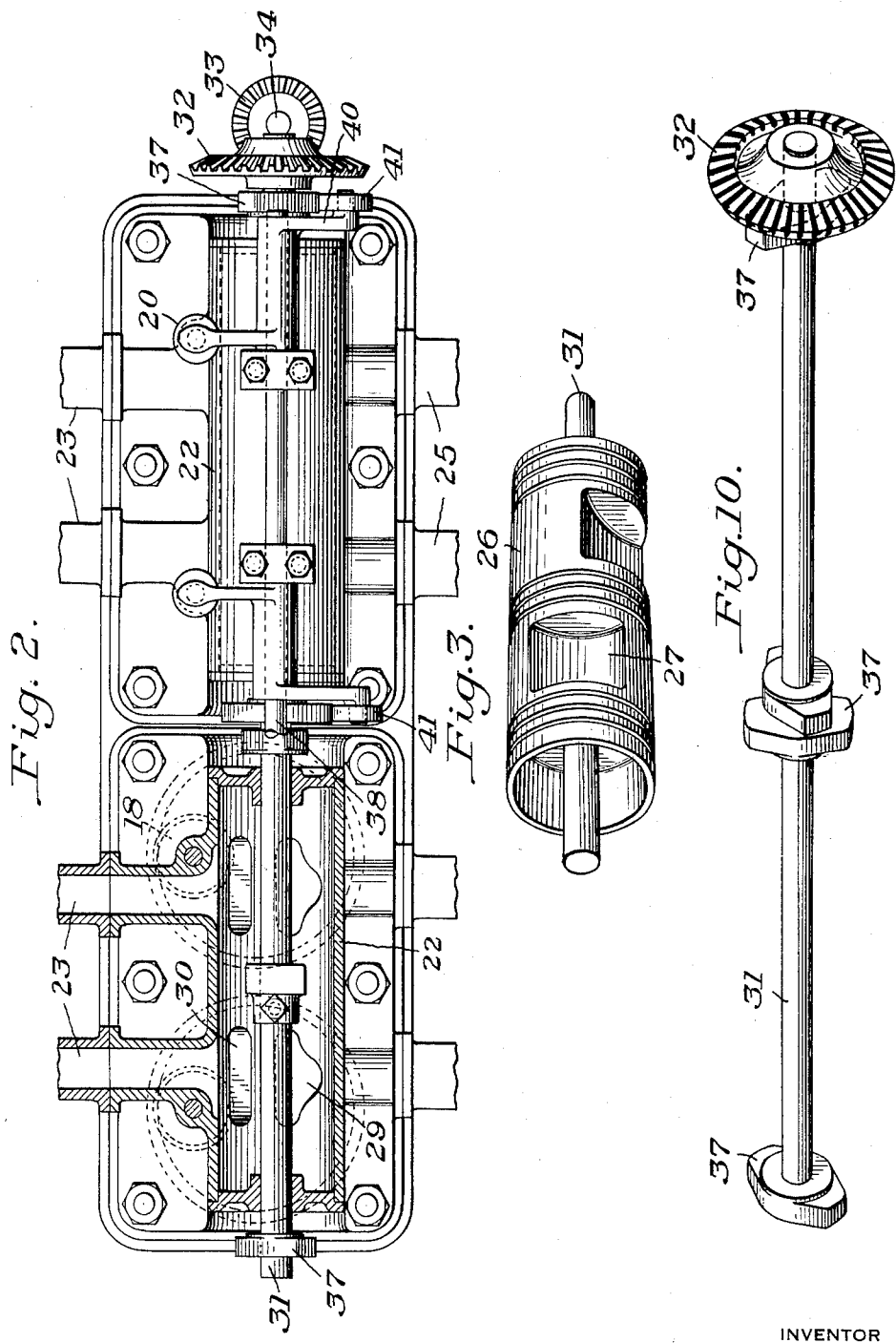

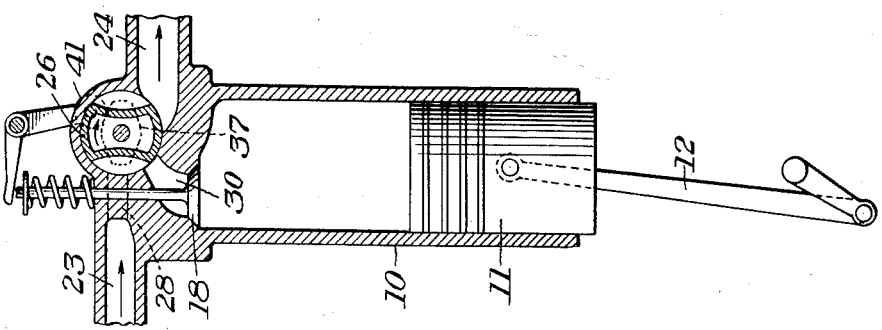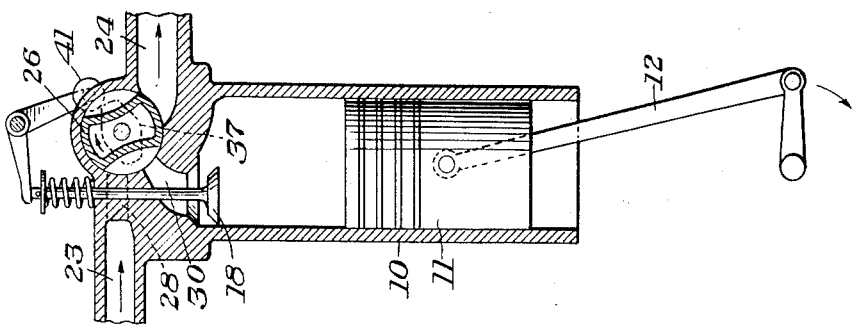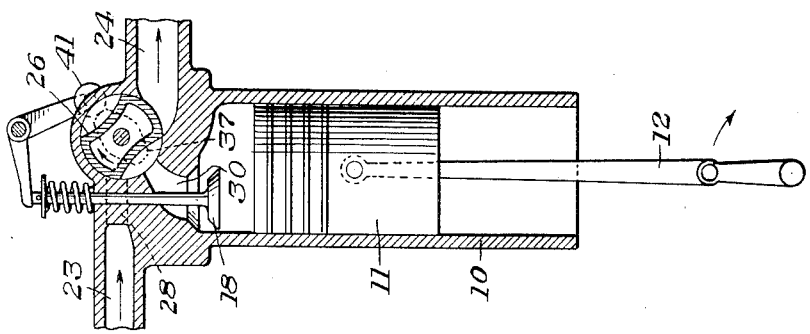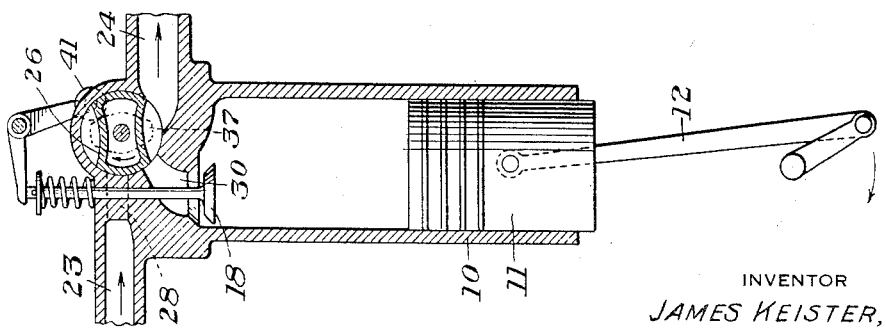
INVENTOR
JAMES KEISTER,

Patented Mar. 20, 1934

1,951,759

UNITED STATES PATENT OFFICE 1,951,759

INTERNAL COMBUSTION ENGINE

James Keister, Steubenville, Ohio

Application November 16, 1931, Serial No. 575,389

12 Claims. (Cl. 123—79)

My invention relates broadly to internal combustion engines and more particularly to the construction and operating arrangement of the valves and the valve-operating mechanism in such engines.

One of the advantages of the poppet-valve engine over the Knight type of sleeve-valve engine is the possibility in the former, because of the cam operation of the poppet valves, of properly timing the opening and closing movements of these valves in respect to the piston stroke. For example, the valve opening for the exhaust may be made to begin shortly before the end of the power stroke and continue throughout the next succeeding exhaust stroke of the piston, and the valve opening for the charge intake may be made to begin promptly at the beginning of the suction stroke and continue throughout that stroke and well into the compression stroke of the piston, with substantial increase in efficiency of the engine over a valve opening for the exhaust only during the exhaust stroke and a valve opening for the intake only during the suction stroke.

Such valve operations have been satisfactorily attained in the usual type of poppet-valve engine with separate intake and exhaust valves for each cylinder, but with the disadvantages of noise, wear and large number of operating parts required for the separate valves, together with reduced thermal efficiency because of the two valve ports in each combustion chamber.

In an attempt to avoid these disadvantages, proposals have been made to use a single poppet valve in each engine cylinder for both the intake and exhaust and a rotary distributor valve for directing the flow of the intake gases to and of the exhaust gases from the cylinder port controlled by the poppet valve. Generally, however, these proposals involved such a speed of cam shaft operation and consequent striking force of the cam on the stem of the poppet valve or its associated operating lever or rod as to defeat the contemplated reduction in the noise and wear incident to the valve operation. Or, where those defects were avoided, the proposals did not present a rotary distributor valve of a form and operating arrangement giving the volume of flow of intake and exhaust gases to and from the combustion chamber required for most efficient engine operation.

In fact, in the prior art proposals, the distributor valve has, so far as I am aware, always been of such ported form and rotation rate as to give reasonably good portings for the flow of the intake and exhaust gases only when set to close the intake at the end of the suction stroke and to open the exhaust only at the end of the power stroke of the piston. When set to open the exhaust prior to the end of the power stroke and to continue the intake beyond the suction into the compression stroke of the piston, these prior art valve arrangements have been such that the volume flow of intake and exhaust gases is reduced below the requirements for efficient engine operation, due to a port edge prematurely moving into position either stopping or at least substantially obstructing the intake and exhaust flow so that the gain in efficiency contemplated by prolonging the intake into the compression stroke and by prolonging the exhaust by beginning the same before the end of the power stroke has not been realized.

Accordingly, one object of my invention is the provision in an internal combustion engine of an arrangement of single pressure-sustaining poppet valve in each cylinder open for intake throughout the suction stroke and into the compression stroke and for exhaust prior to the end of the power stroke and throughout the exhaust stroke of the piston, with operating mechanism therefor which will reduce to the minimum the noise and wear incident to the valve operation, and a rotary distributor valve of such ported form and rotation rate as to provide for that volume of flow of intake gases to and exhaust gases from the combustion chamber required throughout the period of poppet-valve opening for most efficient operation of the engine.

Another object of my invention is the provision of such a combination of single poppet valve and rotary distributor valve as will be applicable not only to the ordinary type of internal combustion engine operating on a charge mixture of air and hydrocarbon but also to the Diesel type of engine in which the oil is injected directly into the combustion chamber separately from the main air intake. When the invention is embodied in the first-mentioned type of engine, the poppet-valve and the rotary distributor valve control the intake of the charge mixture to and the exhaust of the burnt gases from the engine cylinder, and when the invention is embodied in the second-mentioned type of engine the air intake and exhaust are thus controlled but the fuel oil is separately injected into the engine cylinder.

My invention contemplates a single poppet valve in the engine cylinder for intake and exhaust with a cam having two lifting faces or lobes spaced 180 degrees apart from center to center on a cam shaft rotating at one fourth the speed of the crank shaft for effecting the opening movements of the poppet valve, such an arrangement having the advantage of relatively slow movement of impact of the cam or its lever against the valve stem and therefore minimum of noise and wear. My invention also contemplates a simplified form of lever mechanism between the cam and the valve stem for operating the valve by the cam. My invention further contemplates a multi-ported rotary distributor valve of such formation and extent of ports in the line of the rotary movement and of such direction and slow rate of rotation, preferably with the valve having two ports and rotating at one fourth the speed of the engine crank shaft, as to provide passage for the full smooth flow, without sharp deflection, of the intake gases from the supply pipe through the distributor valve to the port of the poppet valve in the engine cylinder during the suction stroke and well into the compression stroke of the piston and a like flow of the exhaust gases from the port of the poppet valve through the distributor valve to the exhaust pipe of the engine beginning prior to the end of the power stroke and extending through the exhaust stroke of the piston.

The foregoing and other objects and principles of my invention will more fully appear from the detailed description of a preferred embodiment of the invention hereinafter described and illustrated in the accompanying drawings forming a part of this specification. It is to be understood, however, that the invention is not limited to the precise form shown but may include other forms and modifications of the form shown within the scope of the appended claims.

In the drawings:

Fig. 1 is a vertical sectional view through one cylinder of a multi-cylinder internal combustion engine constructed according to the present invention;

Fig. 2 presents in its right-hand portion a top plan view of the engine and its its left-hand portion a horizontal sectional view through the valve casing to expose the ports in its bottom;

Fig. 3 is a perspective view of the rotary distributor valve removed from its casing;

Fig. 4 is an elevational view of the gears and shafts employed in driving the valves from the crank shaft of the engine;

Fig. 5 is an elevational view, on a somewhat enlarged scale, of the poppet valve and associated operating mechanism including the cam shaft, which is shown in transverse section, the cam thereon and the valve rocker operated by the cam;

Figs. 6 to 9 inclusive are diagrammatic sectional views showing the various positions of the valves with respect to the piston positions at different points in the cycle of operation of the engine, and illustrating the operating principles of the invention; and Fig. 10 is a perspective view of the shaft of the rotary distributor valve showing the gear at one end forming a part of the drive for that valve and also cams on the shaft for effecting the opening movements of the poppet valve.

In the present illustrative example, the invention is shown as embodied in an oil engine of the Diesel type, although, as before stated, it is applicable as well to an internal combustion engine operating on a charge mixture of gasoline or other volatile hydrocarbon and air.

As each cylinder and the associated piston, valves and valve operating parts of the multi-cylinder engine are alike, the description will primarily be based on the single unit shown in Fig. 1.

In the present illustrative example, the engine, of the four-stroke cycle type, has a water-jacketed cylinder 10, with piston 11, connected by piston rod 12 and crank 13 to the crank shaft 14, all of said parts being of the usual construction. Any usual or desired type of oil injecting device, indicated at 15, may be used to inject the oil into the combustion space on the compression stroke, as is usual in oil engines of the Diesel type, it being understood, of course, that the oil is injected into the air previously drawn into the cylinder and compressed.

The cylinder is provided with a single port 16, in the cylinder head 17, to function both as intake and exhaust port. Of course, when the invention is applied to an oil engine of the Diesel type, as shown, the gas intake through the cylinder port 16 is simply that of the air into which the oil is injected upon the compression stroke of the piston, but when the invention is applied to an engine operating under a charge mixture of air and gasoline or the like, the intake through the port 16 is that of the charge mixture.

The single cylinder port 16 is controlled by a poppet valve 18, the stem of which is slidingly mounted through a vertically extending bore in the cylinder head to enable the poppet valve to partake of a reciprocatory movement, downwardly to open the cylinder port and upwardly to close it. A spring 19, surrounding the projecting portion of the valve stem between washer 20 held by pin 21 thereon and the upper surface of the cylinder head, resiliently retains the poppet valve in closed position and returns it to that position when mechanically moved to open position by means later to be described.

As hereinbefore stated, my invention contemplates the employment of a rotary distributor valve to properly direct the flow of intake gases to the cylinder port and the flow of exhaust gases therefrom. The distributor valve chamber or casing may be separate structurally from the cylinder head if desired, but in the preferred embodiment of my invention as shown the cylinder head is cast in a form to include therein a chamber 22 of interior cylindrical bore for the rotary distributor valve, also a supply intake passage or conduit 23, opening into the valve chamber 22 on one side of the valve chamber above the cylinder port 16, as shown in dotted lines in Fig. 1, and an exhaust-gas outlet passage or conduit 24 leading from the valve chamber on the opposite side of the cylinder port 16. The usual branch pipe 25 leads the exhaust gases from the exhaust passage 24 to the exhaust manifold of the engine.

The preferred form of rotary distributor valve of my invention, and one which has been found in actual practice to be admirably adapted to the attainment of the objects of my invention, is a valve driven at one fourth the speed of the engine crank shaft and of cylindrical contour having two oppositely disposed peripheral concave ports of curvilinear form each subtending a chord of approximately a 90 degree arc of the rotating cylindrical face of the valve. With that form and rotation rate of the valve, the gas intake port in the cylindrical valve chamber and the port for the exhaust therefrom are each disposed substantially less than 45 degrees of arc along the chamber wall from the opening therein leading to the intake and exhaust port of the engine cylinder.

That preferred form of distributor valve is the one shown as employed in the present illustrative embodiment of the invention. The valve is indicated as a whole by the numeral 26 and its general cylindrical contour is best shown in Fig. 3 while the oppositely disposed peripheral pockets or ports in the cylindrical face of the valve are shown at 27 in Fig. 1 in section in a plane transverse to the axis of rotation. From Figs. 1 and 3, it is also to be noted that all points in the boundary wall of the pocket-like ports of the rotary valve are in curved planes, the curvature of surface extending not only in planes transverse to the axis of rotation but also in planes through that axis of rotation.

It is further to be noted from Fig. 1 that the gas intake port 28 and the exhaust outlet port 29 in the cylindrical wall of the valve chamber are disposed on opposite sides of the common port in that chamber which communicates with the passage 30 leading from the distributor valve chamber to the cylinder port 16 and are slightly less than 90 degrees apart measured along the inner circumference of the cylindrical valve chamber. This provides for a slight opening of the gas intake port 28 in the valve chamber when the rotary distributor valve has just closed the exhaust outlet port 29 in that chamber, as shown by the position of the valve in Fig. 7, so that when the piston has completed its exhaust stroke and is about to begin its suction stroke, the distributor valve provides for the immediate flow of the intake gas as soon as the piston begins its suction effect. The passage 30 in the cylinder head may be termed an intake-and-exhaust passage since it functions to deliver the intake gas from the distributor valve chamber to the cylinder port controlled by the poppet valve and to deliver the exhaust gas from the cylinder port to the distributor-valve chamber.

In addition to the last-mentioned feature of a slight opening of the gas intake port in the valve chamber when the rotary valve has just closed the exhaust port in that chamber, the disposition of the intake and exhaust ports 28 and 29 in the valve-chamber wall not more than, and preferably less than, 90 degrees apart, with the common port to the intake-and-exhaust passage 30 between them, and the 90 degree extent and curvilinear form of each of the two ports of the rotary valve, together with the rotation rate of that valve of one fourth the speed of the crank shaft, are features which have been found in actual tests of an engine thus constructed to give a smooth full flow of the intake and exhaust gases to and from the engine cylinder throughout the entire period the poppet valve remains open. In other words, that means a full smooth flow into the cylinder of the intake gas throughout the suction stroke and into the compression stroke and a like flow from the engine cylinder of the exhaust gases beginning prior to the end of the power stroke and throughout the exhaust stroke of the piston.

Any suitable means may be employed for driving the shaft 31 of the rotary distributor valve at one fourth of the speed of the engine crank shaft. I preferably, however, employ the means shown in Fig. 4. As there shown, the valve shaft 31 is driven in clockwise direction from the crank shaft 14 through the bevel gear 32 on the end of the valve shaft and the coacting gear 33 on the upper end of the upright shaft 34, the shaft 34 in turn being driven through the helical gear 35 secured to its lower end and the coacting helical gear 36 fitted on the crank shaft 14.

Preferably, and as shown, the shaft 31 of the rotary distributor valve is also utilized to operate the poppet valve controlling the single port of the engine cylinder which functions for both intake and exhaust. A two-lobed cam 37, fixedly mounted on the shaft 31 is employed for each poppet valve, with the lobes or lifting surfaces of the cam disposed 180 degrees apart from center to center. Above the valve shaft 31 a shaft 38 is horizontally mounted in uprights 39 extending from the top surface of the cylinder head or that part of the cylinder head casting forming the distributor-valve chamber, and a bell crank lever 40 for each poppet valve and cam is pivotally mounted on shaft 38. A roller 41 is journaled in the free end of the depending arm of the bell crank, and the other arm of the bell crank extends horizontally over the stem of the poppet valve. The described arrangement is such that the roller on the depending arm of the bell crank is forced by the unbalanced weight of this lever mechanism into constant contact with the cam 37 on the shaft 31, and when the roller is between the lifting surfaces of the cam the other arm of the bell crank is closely above but not in actual contact with the stem of the closed poppet-valve. When, however, the rotation of the cam in clockwise direction brings one of its lifting surfaces into engagement with the roller, the bell crank is rocked in a direction to cause its horizontal arm to engage the stem of the poppet valve and thereby move that valve downwardly to open the cylinder port 16. Upon rotation of the cam enough to carry its lifting surface past the roller, the bell crank returns by gravity to a position freeing the poppet valve for its return to closing positions under the influence of its spring.

The employment of a cam with two lobes or lifting faces 180 degrees apart from center to center enables the relatively slow rotation rate of one fourth that of the crank shaft to effect the opening and closing movements of the poppet valve at the proper times in the cycle of piston movements with a minimum of force of cam impact and consequently of noise and wear, for, of course, the force of cam impact varies directly with the rotational speed of the cam.

Furthermore, with the highest parts of the cam disposed 180 degrees apart and the cam symmetrical on opposite sides of its axis of rotation as shown in Figs. 1 and 6 to 9 inclusive, there is no sharp striking action of the free end of the cam lever against the end of the valve stem, and therefore no resulting sharp noise and wear of the contacting parts. On the contrary, with the parts positioned as in Fig. 1 and the cam rotating in the direction of the arrow slowly at one-fourth of the crank shaft speed, the roller 41 smoothly rides up the side of the cam (relatively considered) and the free end of the cam lever smoothly descends into pressing rather than sharp striking engagement with the end of the stem of the poppet valve. Likewise, when the roller rides off the highest part of the cam down the opposite side, in moving for example from the position shown in Fig. 8 to the position shown in Fig. 9, the descent of the roller is as smooth as its rise, and consequently the closing movement of the poppet valve, although effected by its spring, is so controllably restrained by the end of the cam lever that closing movement is as gentle as its opening movement.

It is further to be noted that in the foregoing arrangement of my invention, the cam and valve rocker are so cooperatively arranged, and with the radius of the rocker arm 40 of just sufficient length, that as the roller 41 follows the cam the axis of the roller approaches close to but does not fall on a line drawn from the center of the cam shaft to the pivot of the valve rocker. Such an arrangement gives a valve action which is quickly responsive to the movement of the cam and is of especial advantage for a cam having the slow ratio of one-fourth of the crank shaft speed as in the present invention. This is of particular advantage in giving good valve action at the beginning of the exhaust shown in Fig. 6 which illustrates an immediate as well as adequate opening of the poppet valve at the moment when the piston has advanced to within a certain distance of the end of the power stroke. This combination of slow moving cam and rocker arm also enables the cam to be so graduated that the valve will remain nearly fully open up to any desired point and then close almost instantly, thus allowing a full charge on the intake stroke. This is illustrated in Figs. 8 and 9 by the change from open to closed position of the poppet valve for a comparatively small degree of angular movement of the cam.

In consequence of the entire foregoing valve-operating mechanism, the initial opening and final closing movements of the poppet valve are sufficiently rapid to secure a very advantageous valve action at all engine speeds while at the same time a sharp striking action, either of the cam lever against the valve stem in the opening of the valve or of the valve against its seat in the closing of the valve, is avoided.

The extent of the lobes or lifting faces of the cam in the line of cam rotation, like the extent of the ports in the rotary distributor valve, is, of course, made such as to maintain the valve in open position sufficiently long for the prolongation of the periods of intake and exhaust hereinbefore referred to.

The valve operations will more fully appear from the positions of the parts as shown in Figs. 1 and 6 to 9 inclusive.

Fig. 1 shows the position of the piston, the poppet-valve and its cam and the distributor valve upon a 30 degree advance on the power stroke, the poppet valve, of course, being closed, and the distributor valve closing the port 30 in the valve chamber leading to the cylinder port.

Fig 6 shows the piston as having advanced 150 degrees of crank shaft movement on its power stroke so that it is 120 degrees from its Fig. 1 position and within 30 degrees from the end of that stroke. The cam 37, which rotates at one fourth the speed of the crank shaft, has, therefore, turned, in clockwise direction, 30 degrees from its position shown in Fig. 1, so that its advancing lobe has sufficiently engaged the roller of the bell crank to open the poppet valve to begin the exhaust. Likewise, the rotary distributor valve has turned 30 degrees in clockwise rotation from its position shown in Fig. 1 and in consequence has opened communication between the cylinder port and the exhaust pipe through one of the curved pocket-like ports of the valve.

Fig. 7 shows the piston as having advanced to the end of the exhaust stroke, which means 210 degrees of crank shaft rotation from the Fig. 6 position. Consequently the cam 37 and the rotary distributor valve have rotated 52½ degrees from their position shown in Fig. 6, which movements dispose the cam lobe in position against the bell-crank roller still maintaining the poppet valve open and the rotary valve in position just closing the outlet from the valve chamber to the exhaust pipe and slightly opening the gas intake to the valve chamber. Thus the piston is about to begin its suction stroke and the valves are open for the gas intake.

Fig. 8 shows the piston as having advanced 90 degrees of crank shaft movement on its suction stroke or 90 degrees from its Fig. 7 position. Consequently the cam and distributor valve have rotated 22½ degrees from their positions shown in Fig. 7, which movements dispose the cam still in position operative to maintain the poppet valve open and the distributor valve fully opening the gas intake to the valve chamber without in any degree obstructing the outlet from the valve chamber to the cylinder port. In addition to the disposition of the intake port 28 and the exhaust port 29 of the distributor-valve casing less than 90 degrees apart measured along that part of the inner circumference of the valve chamber which opens to the engine cylinder, it is to be noted that the intake port 28 and the exhaust port 29 of the valve chamber are on opposite sides of vertical plane passing through the axis of rotation of the distributor valve. It is because of this arrangement, in association with the curved pockets of the distributor valve of approximately 90 degrees arc, that the movement of the valve to position fully opening the intake port, as shown in Fig. 8, does not cause any part of the valve body to obstruct the passage of the gas from the valve-chamber intake to the port leading to the engine cylinder. In other words, while the upper edge of the distributor valve, in moving from the position shown in Fig. 7 to the position shown in Fig. 8, fully opens the intake port 28 to the valve chamber, the opposite lower edge of the valve does not approach close enough to the port leading to the engine cylinder to obstruct to any degree whatever the passage of the gas from the intake 28 to the engine cylinder. This is an important feature of my invention avoiding the defect commonly found in rotary distributor valves of one port edge prematurely closing or at least substantially obstructing the outlet from the valve chamber to the intake port of the cylinder when the distributor valve fully opens the gas intake into the valve chamber. From Fig. 8, it is seen that the upper port edge of the distributor valve has fully opened the gas intake 28 while at the same time there has been no advancing movement of the corresponding lower port edge over the outlet from the valve chamber to the port in the engine cylinder. That feature of operation is attained in the present example of my invention by the disposition of the ports in the valve-chamber wall and the 90 degree extent of porting of the distributor valve and its slow rotation rate of one fourth of the crank shaft speed. The practical advantage of that feature is further apparent from the fact that when the piston is 90 degrees or midway on its suction stroke, as shown in Fig. 8, it is partaking of its maximum speed of linear movement and therefore exerting its greatest suction effect on the intake gases, so that provision for a full unobstructed volume of flow through the distributor valve to the cylinder port is then of particular importance.

Fig. 9 shows the piston as having advanced through the suction stroke and 20 degrees on the compression stroke, or 110 degrees from its Fig. 8 position. Consequently the cam and the distributor valve have rotated 27½ degrees from their positions shown in Fig. 8, which movements dispose the lifting face of the cam beyond the bell-crank roller, and therefore the poppet valve closed under its spring, and the distributor valve closing communication between the valve chamber and the cylinder port. Thus the parts are in position for compression of the charge confined in the engine cylinder and thereafter the advance on the power stroke to the position of the piston as shown in Fig. 1.

By the foregoing valve arrangements, therefore, the poppet valve opens the port in the engine cylinder for intake and exhaust through 410 degrees of crank shaft movement out of the 720 degrees of the complete four-stroke cycle and the distributor valve provides a smooth full flow of intake gases to and exhaust gases from the engine cylinders throughout the entire period of poppet-valve opening.

It will be understood, of course, that the foregoing description has, for brevity, been confined to the valves and their operating mechanism for one cylinder. I generally prefer to unite the distributor valves for at least two adjacent cylinders in one unitary structure as shown in Fig. 3, with the ports angularly displaced as shown in correspondence with the different positions of the pistons in the adjacent cylinders.

I have found an engine constructed with the valve arrangements of my invention as described above under actual tests to give a smooth and silent valve operation and the valve portings required for smooth and unobstructed flow of intake gases to and exhaust gases from the engine cylinder needed for proper engine operation and especially needed when the gas intake and exhaust periods are prolonged by extending the intake into the compression stroke and by beginning the exhaust prior to the end of the power stroke.

What is claimed is:

1. An internal combustion engine comprising, in combination, a cylinder and a reciprocating piston therein, said cylinder having a port for intake and exhaust and a poppet valve arranged to open said port prior to the end of the power stroke and to maintain said port open thereafter through the exhaust and suction strokes and into the compression stroke of said piston and then to close said port, a distributor-valve chamber outside said cylinder having a gas intake port for intake of charging gas to said valve chamber and an exhaust port for discharge of exhaust gas from said valve chamber and a common port for the delivery of charging gas from said valve chamber to said cylinder port and for reception of exhaust gases from said cylinder port into said valve chamber, and a rotary valve in said valve chamber having such contour and extent of ports and driving means in such timed relation and speed ratio with the engine crank shaft as to simultaneously close said exhaust port of said valve chamber and open communication between said gas intake port and said common port of said valve chamber.

2. An internal combustion engine as defined in claim 1 and in which said rotary valve has two oppositely disposed ports and said driving means for said valve comprises a two-lobed cam with its high points 180 degrees apart and means for driving said cam at one quarter the speed of the engine crank shaft.

3. An internal combustion engine comprising, in combination, a cylinder and a reciprocating piston thereon, said cylinder having a port for intake and exhaust and a poppet valve arranged to open said port prior to the end of the power stroke and to maintain said port open thereafter through the exhaust and suction strokes and into the compression stroke of said piston and then to close said port, a distributor-valve chamber having a gas intake port for intake of charging gas to said valve chamber and an exhaust port for discharge of exhaust gas from said valve chamber and a common port for the delivery of charging gas from said valve chamber to said cylinder port and for the reception of exhaust gases from said cylinder port into said valve chamber, and a rotary valve in said valve chamber having such contour and extent of ports and driving means in such timed relation and speed ratio with the engine crank shaft as to advance a port of said valve in direction to open communication between said gas intake port and said common port of said valve chamber simultaneously with the advance of another part of said valve to position just closing said exhaust port of said valve chamber.

4. An internal combustion engine comprising, in combination, a cylinder and a reciprocating piston therein, said cylinder having a port and a poppet valve spring pressed to close said port, means to positively open said valve prior to the end of the power stroke and to maintain the same in opening position thereafter through the exhaust and suction and into the compression strokes of said piston, said means comprising a two-lobed cam and a shaft therefor disposed laterally of the poppet valve, means for driving said shaft at one fourth the speed of the engine crank shaft, a valve rocker having one arm engaging the end of the stem of said poppet valve and another arm bearing a roller engaging said cam with said valve rocker and roller in such relation to said cam as to cause said valve to partake of very quick opening and closing movements, an intake pipe and an exhaust pipe for said engine, and a double ported rotary distributor valve outside said cylinder driven at one fourth the speed of the crank shaft of said engine for connecting said cylinder port successively with said exhaust pipe and said intake pipe throughout each period of said poppet-valve opening.

5. An internal combustion engine as defined in claim 4 and in which said rotary distributor valve is mounted on and driven through said cam shaft.

6. An internal combustion engine comprising, in combination, a cylinder and a reciprocating piston therein, said cylinder having a common intake and exhaust port and a poppet valve controlling said port, a valve chamber outside said cylinder, said valve chamber having a cylindrical bore, a common intake-and-exhaust passage extending from said bore of the valve chamber to said cylinder port, said valve chamber having a gas intake port entering its cylindrical bore for intake of charging gas to said valve chamber and an exhaust port for discharge of exhaust gas from said valve chamber, a ported rotary valve in said chamber, said gas intake and exhaust ports and said rotary valve being so arranged that said rotary valve completely opens said gas intake port without any obstructing movement of said valve over said intake-and-exhaust passage.

7. An internal combustion engine comprising, in combination, a cylinder and a reciprocating piston therein, said cylinder having a common intake and exhaust port and a poppet valve controlling said port, a cylindrical valve chamber outside said cylinder, said chamber having a common port for delivery of charging gas to and reception of exhaust from said cylinder, an intake-and-exhaust passage connecting said common port with said cylinder port, a cylindrical rotary valve in said chamber, said chamber having a gas-intake port for intake of charging gas to said chamber and a gas-exhaust port for discharge of exhaust gas from said chamber on opposite sides of the axis of rotation of said valve and with said common port between them, and said rotary valve having a port so spanning said common port and said gas intake port as to completely open said gas intake port without obstructing movement over said common port or said passage leading therefrom.

8. An internal combustion engine as defined in claim 7 and in which the ports of said rotary valve are in the form of pockets in the cylindrical face of said valve with said pockets of concave curvature in planes transverse to the axis of rotation of said valve.

9. An internal combustion engine comprising, in combination, a cylinder and a reciprocating piston therein, said cylinder having a common intake and exhaust port and a poppet valve spring-pressed to close said port, said cylinder having a guide surrounding the stem on said valve and said valve having a stem extending to a free end beyond said guide, means to positively open said valve and to control its closing movement against the pressure of its spring, said means comprising a cam element rotatably driven at one fourth of the crank shaft speed and having cam surfaces, with the high points approximately 180 degrees apart, said cam being disposed laterally of the stem of the poppet valve, cam-operated mechanism having a cam-engaging part and a valve-engaging part operatively adjacent the end of the stem of said valve, said cam surfaces being so graduated and said parts of the cam-operated mechanism being so arranged that as said cam is rotated said valve-engaging part advances in a direction and at a rate exerting a pressing action on said valve stem to positively open said valve and then retreats in a manner controllably restraining the action of the valve spring in closing said valve whereby sharp impact of said valve-engaging part against said valve stem and of said valve against its seat is avoided.

10. An internal combustion engine comprising, in combination, a cylinder and a reciprocating piston therein, said cylinder having a common intake and exhaust port and a poppet valve spring-pressed to close said port, said cylinder having a guide surrounding the stem on said valve and said valve having a stem extending to a free end beyond said guide, means to positively open said valve and to control its closing movement against the pressure of its spring, said means comprising a two-lobed cam symmetrical on opposite sides of its axis of rotation and having the lobes disposed approximately 180 degrees apart from center to center, said cam being disposed laterally of the stem of the poppet valve, means for driving said cam at one-fourth the crank shaft speed, a pivoted lever having one arm disposed in constant engagement with said cam and another arm disposed operatively adjacent the end of said valve stem whereby as the cam-engaging arm of said lever engages against the sides and over the lobes of said cam the other arm of the lever advances in a direction and at a rate exerting a pressing action on said valve stem to positively open said valve and then retreats in a manner controllably restraining the action of the valve spring in closing said valve whereby sharp impact of said lever against said valve stem and of said valve with its seat is avoided.

11. An internal combustion engine comprising, in combination, a cylinder and a reciprocating piston therein, said cylinder having a common intake and exhaust port and a poppet valve controlling said port, means for rapidly opening said valve from fully closed position and for rapidly closing said valve from approximately fully open position comprising a cam with its high points approximately 180 degrees apart, disposed laterally of the stem of said valve and rotatably driven at one-fourth of the crank shaft speed, and a pivoted lever having one arm extending from the pivot to operative relation with the end of the valve stem and the other arm provided with a roller engaging said cam, said lever having a location of pivot and length of cam-engaging arm such that as the roller engages the low parts of the cam the roller axis approaches close to but does not fall on a line drawn from the said pivot to the axial center of the cam.

12. An internal combustion engine comprising, in combination, a cylinder and a reciprocating piston therein, said cylinder having a common intake and exhaust port and a poppet valve for controlling said port, means for rapidly opening said valve from fully closed position and for rapidly closing said valve from approximately fully open position comprising a cam having high points approximately 180 degrees apart, disposed laterally of the stem of said valve and rotatably driven at one-fourth of the crank shaft speed, and a lever so pivoted with respect to said cam that a line drawn from the pivot to the axial center of the cam is approximately parallel with the stem of said valve, said lever having one arm extending from said pivot into operative relation with said valve stem and its other arm of such length as to engage the low parts of the cam at a point closely approaching but not falling on said line between the pivot of the lever and the axial center of the cam.

JAMES KEISTER.